(12) United States Patent
Burke

(10) Patent No.: US 6,651,415 B2
(45) Date of Patent: Nov. 25, 2003

(54) HEIGHT ADJUSTMENT APPARATUS FOR TURF MAINTENANCE EQUIPMENT

(75) Inventor: Steven A. Burke, Champlin, MN (US)

(73) Assignee: National Mower Cormpany, St. Paul, MN (US)

(*) Notice: Subject to any disclaimer, the term of this patent is extended or adjusted under 35 U.S.C. 154(b) by 54 days.

(21) Appl. No.: 10/058,463

(22) Filed: Jan. 28, 2002

(65) Prior Publication Data

US 2003/0140611 A1 Jul. 31, 2003

(51) Int. Cl.[7] .................. A01D 34/03; A01D 34/43; A01D 34/64
(52) U.S. Cl. .................. 56/17.2; 56/DIG. 10
(58) Field of Search .................. 56/17.2, 6, 249, 56/14.9, 17.1, 16.7, DIG. 10, 322; 16/19, 30; 280/43.13, 43.17, 86, 89, 47.11, 79.11

(56) References Cited

U.S. PATENT DOCUMENTS

| | | | | |
|---|---|---|---|---|
| 2,485,312 A | * | 10/1949 | Powell | 56/253 |
| 2,507,758 A | * | 5/1950 | Daggett | 56/15.3 |
| 4,275,552 A | * | 6/1981 | DeCoene | 56/370 |
| 4,836,295 A | * | 6/1989 | Estes | 172/146 |
| 4,905,463 A | * | 3/1990 | Eilles | 56/17.2 |
| 5,085,044 A | | 2/1992 | Freier, Jr. et al. | |
| 5,241,810 A | | 9/1993 | Reichen | |
| 5,463,855 A | * | 11/1995 | Johnson et al. | 56/17.2 |
| 5,797,252 A | * | 8/1998 | Goman | 56/17.2 |
| 6,212,863 B1 | | 4/2001 | Thomas | |
| 6,339,918 B1 | | 1/2002 | Thomas | |

* cited by examiner

Primary Examiner—Árpád Fábián Kovács
(74) Attorney, Agent, or Firm—Jeffrey R. Stone; Briggs and Morgan, P.A.

(57) ABSTRACT

A height adjustment apparatus having a frame bracket attached to the frame with no relative movement therebetween, and a threaded rod threaded through the frame bracket. A nut is rigidly attached to a top end of the threaded rod. A swivel head is rotationally attached to the lower end of the rod, with the swivel head being attached to a ground contacting support. The apparatus further includes a socket configured to slidably receive the nut and the frame bracket. A spring is provided for slidably biasing the socket into a non-rotational aspect relative to the frame bracket.

19 Claims, 5 Drawing Sheets

HEIGHT ADJUSTMENT APPARATUS FOR TURF MAINTENANCE EQUIPMENT

FIELD OF THE INVENTION

The present invention relates generally to equipment used to set the operational height of lawnmowers and other turf maintenance equipment.

BACKGROUND OF THE PRESENT INVENTION

Height adjustment mechanisms in the turf maintenance industry generally require tools, removal and insertion of mechanical parts. These and other applications require that the height adjustments be made at discreet intervals. Existing methods to accomplish the height adjustment needed to control the height of grass cut typically use one of two general methods. The first method uses two parallel plates, oriented in a vertical plane, each plate having a series of holes. One plate is attached to the cutting unit, the other plate is attached to castors, rollers, or other similar devices that control the height of the grass cut. During operation, the plates are held in general proximity to one another by a pin or other fastener extending between the two plates. The relative position of the plates, and consequently the height of cut, may be changed by removing the fastener and then lifting, or lowering, the cutting unit to the desired height. When the desired height is reached, the fastener is reinserted into a hole or holes closest to the desired height. This method requires removal and reinsertion of a mechanical device to accomplish the height adjustment. Additionally, the height adjustment is relatively imprecise; that is, the fastener holes are located at fixed intervals requiring the cutting unit to conform to the corresponding height intervals.

The second method uses a rod or shaft, oriented vertically, retained against the frame of the cutting unit. The lower end of the shaft is connected to a castor, roller, or similar device. The shaft can be raised or lowered relative to the frame and held in place by mechanical fasteners such as nuts, stacked spacers, or threaded hardware when the rod is also threaded. This method requires use of tools to remove and replace the mechanical fasteners. Alternatively, the stacked spacer configuration requires removal or replacement of the spacers to adjust the height and results in a relatively imprecise height adjustment.

The present invention for controlling the height of the cut grass generally addresses these problems typically found on lawnmowers or other turf maintenance equipment. The present invention allows the cutting unit of the lawnmower or turf maintenance equipment to be raised or lowered more precisely relative to the generally horizontal plane of the ground and the grass without the use of tools or mechanical fasteners or other devices that must be removed and reinserted.

SUMMARY OF THE INVENTION

It is an object of the present invention to provide a new and improved apparatus that is not subject to the foregoing disadvantages by providing an improved apparatus for more precisely controlling the height of grass cut by lawnmowers as well as the operational height of other turf maintenance equipment without the use of tools or removal and replacement of mechanical hardware.

The foregoing object of the present invention is provided by an improved height adjustment apparatus for turf maintenance equipment having a ground contacting support and a frame supporting an operational unit. In the case of lawnmowers the operational unit is a cutting unit. It is understood that present invention will also have application to other turf maintenance equipment such as lawn sweepers, lawn rakes, aerators, and other similar equipment. The height adjustment apparatus includes a frame bracket that is attached to the frame with no relative movement therebetween, and a threaded rod threaded through a threaded central bore in a frame bracket. The threaded rod has a nut attached at the upper end thereof and a swivel head attached to the lower end, with the swivel head being attached to the ground contacting support. The swivel head has a substantially smooth bore that receives the threaded rod. The portion of the threaded rod in contact with the swivel head is free from threads and is substantially smooth. The thread-free end of the threaded rod is then free to rotate relative to the swivel head during the height adjustment operation. The height adjustment apparatus further includes a socket having a central bore, the socket being configured to slidably receive the nut and the frame bracket and means for preventing rotation of the socket relative to the nut and the frame bracket. A biasing means is provided for slidably biasing the socket into a non-rotational aspect relative to the frame bracket. It is understood that the socket can be held in non-rotational engagement with the frame bracket by mechanical means or by manufacturing the socket with sufficient mass such that gravity holds the socket engaged with the frame bracket.

In one embodiment of the present invention the means for preventing relative rotation between the socket and nut and the socket and the frame bracket may be providing the socket with generally the same cross section as the nut and the frame bracket. Another means for preventing relative rotation may be providing generally complementary cross sections to the upper end of the socket and the nut and generally complementary cross sections to the lower end of the socket and the frame bracket.

A height adjustment apparatus in accord with the present invention may be operated by moving the socket directionally away from the frame bracket against the force of the biasing means a distance sufficient to allow the socket to disengage from the frame bracket. During this operation, the socket remains slidably engaged with the nut with no rotational movement relative to the nut. When the socket slidably disengages from the frame bracket, the socket can then be rotated, wherein the rotation of the socket causes the nut and threaded rod to rotate in the selected direction. The rotation of the threaded rod causes the rod to engage the threads of the frame bracket; that is, rotation of the threaded rod results in the rod being screwed further in or out relative to the fixed position of the frame bracket and the frame itself. The movement of the rotating rod causes the distance between the frame bracket and the swivel head to change, thus changing the height of the cutting unit relative to the ground contacting support. Because the height of the cutting unit relative to the ground determines the height of the cutting, altering the distance between the frame bracket and swivel head will either increase or decrease the height of the grass cut. This height adjustment operation is accomplished without use of tools or removal and insertion of mechanical parts. The precision of the height adjustment operation is limited only by the thread spacing of the threaded rod and the profiles of the socket, nut and frame attachment.

In another embodiment of the present invention, the rod is threadably engaged with the swivel head while rotationally engaged with the frame bracket. The rod is prevented from vertical translation relative to the frame bracket. This vertical retention function is accomplished by, for example, a differential in the rod's diameter with the larger diameter portion being captured between two portions of the frame bracket.

To accomplish the height adjustment operation in this embodiment, the socket is moved directionally away from the frame bracket against the force of the biasing means a distance sufficient to allow the socket to disengage from the frame bracket. During this operation, the socket remains slidably engaged with the nut with no rotational movement relative to the nut. When the socket slidably disengages from the frame bracket, the socket can then be rotated, wherein the rotation of the socket causes the nut and threaded rod to rotate in the selected direction. In this embodiment, the rotation of the threaded rod causes the rod to engage the threads of the swivel head; that is, rotation of the threaded rod results in the rod being screwed further in or out of the swivel head, relative to the fixed position of the rod, frame bracket and the frame itself. The movement of the rotating rod causes the distance between the frame bracket and the swivel head to change, thus changing the height of the cutting unit relative to the ground contacting support.

The foregoing objects of the invention will become apparent to those skilled in the art when the following detailed description of the invention is read in conjunction with the accompanying drawings and claims. Throughout the drawings, like numerals refer to similar or identical parts.

DETAILED DESCRIPTION OF THE INVENTION

Figure 1:
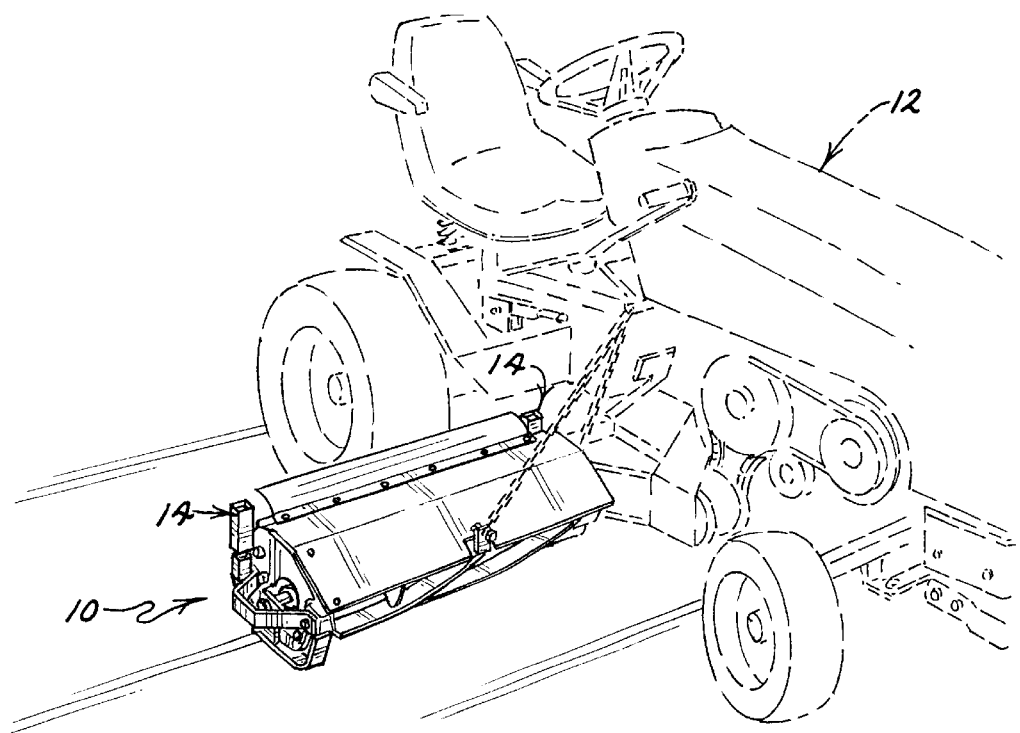
FIG. 1 illustrates the present invention operationally attached to a lawn tractor with a side mowing assembly.

A mower assembly 10 attached to the right side of a lawn tractor 12 is shown in FIG. 1. A height adjustment apparatus 14 in accord with the present invention is shown attached to the mower assembly 10 and is shown in greater detail in other figures to be described below.

Figure 2:
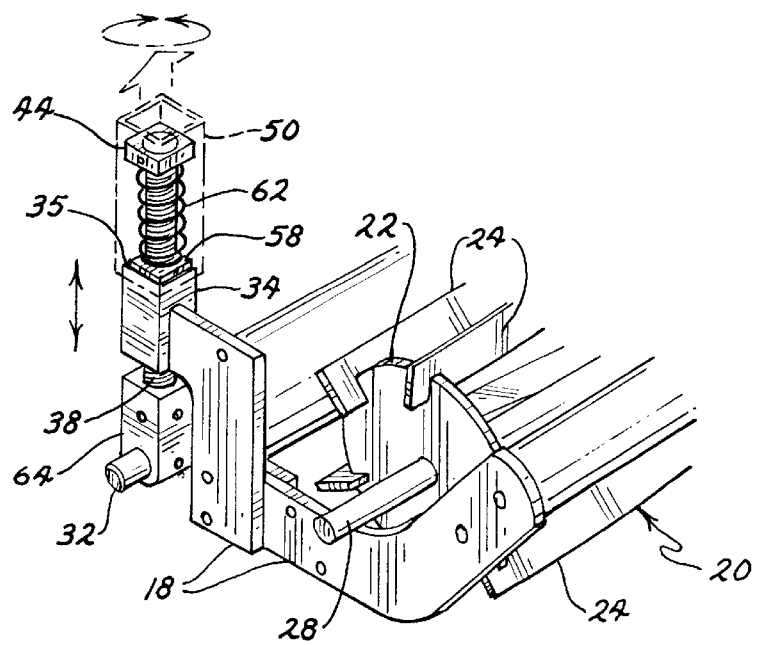
FIG. 2 shows the invention in a perspective view with the socket shown in phantom outline in operational position.
Figure 3:
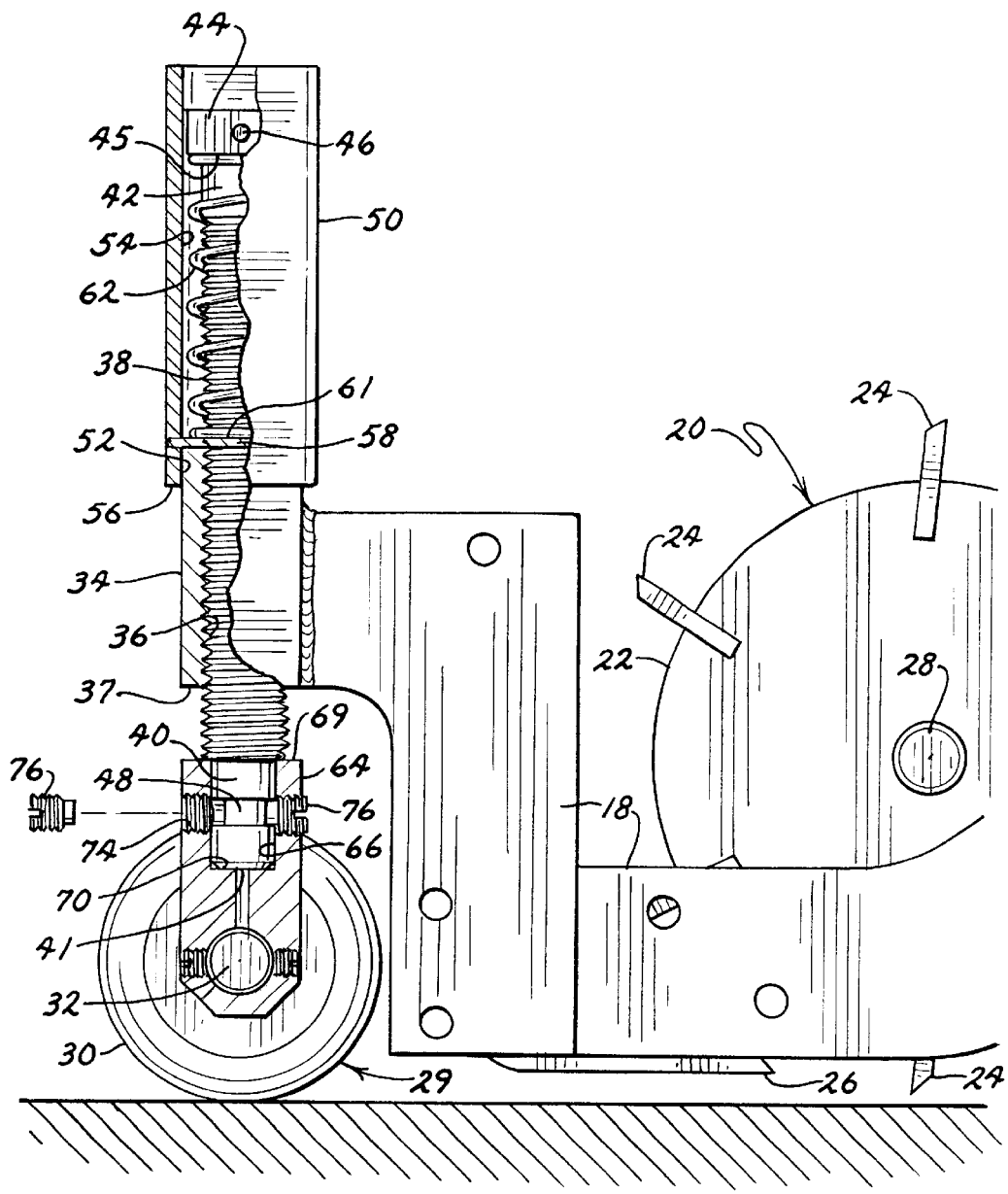
FIG. 3 is a side elevation view of the invention with a portion of the socket removed to expose the threaded rod, spring and spring retainer and a portion of the frame bracket removed to expose the engagement between the rod and the frame bracket, the machined groove in the rod and screws.

As shown in FIGS. 2 and 3, the mower assembly 10 has a ground contacting support and a frame 18 that supports a cutting unit 20. The Figures show the ground contacting support embodied as a roller shaft assembly 29 including a roller shaft 32 and a ground engaging roller 30. Other embodiments of ground contacting supports are well known in the art. It is understood that in practice the ground contacting support may be one or more casters, wheels, or skid plates. The cutting unit 20 includes a cutting reel 22 including blades 24, a bed knife 26 and a cutting reel shaft 28. The cutting reel 22 is mounted for rotation on the cutting reel shaft 28. It will be noted that the appropriate bearing and bearing support structures for the cutting reel shaft 28 and the drive apparatus for providing rotational drive motion to the cutting reel shaft 28 and thus the cutting reel 22 has been omitted from the figures for purposes of clarity. In operation, it is understood that the cutting reel 22 is rotated, causing grass to be caught between the rotating blades 24 and the bed knife 26, thereby cutting the grass. It is further understood that in practice any type of rotary cutting unit may be used to accomplish the cutting operation.

The height of the grass after cutting is adjusted by controlling the height of the cutting unit relative to the ground. In turn, this height control is provided by the relative position of the frame 18 to the roller shaft assembly 29. It will be observed that the assembly 29 includes a freewheeling, ground-engaging roller 30 rotationally supported by a roller shaft 32. The roller 30 is in substantially continuous contact with the ground during mowing operations. Raising the height of the frame 18 relative to the assembly 29 thus elevates the cutting unit relative to the ground, thereby resulting in grass being cut at a longer length. Similarly, lowering the height of the frame 18 relative to the assembly 29 thus lowers the cutting unit relative to the ground, thereby resulting in grass being cut at a shorter length. It is understood that the present invention has application to a variety of turf maintenance equipment, including but not limited to lawn sweepers, lawn rakes and aerators.

Figure 4:
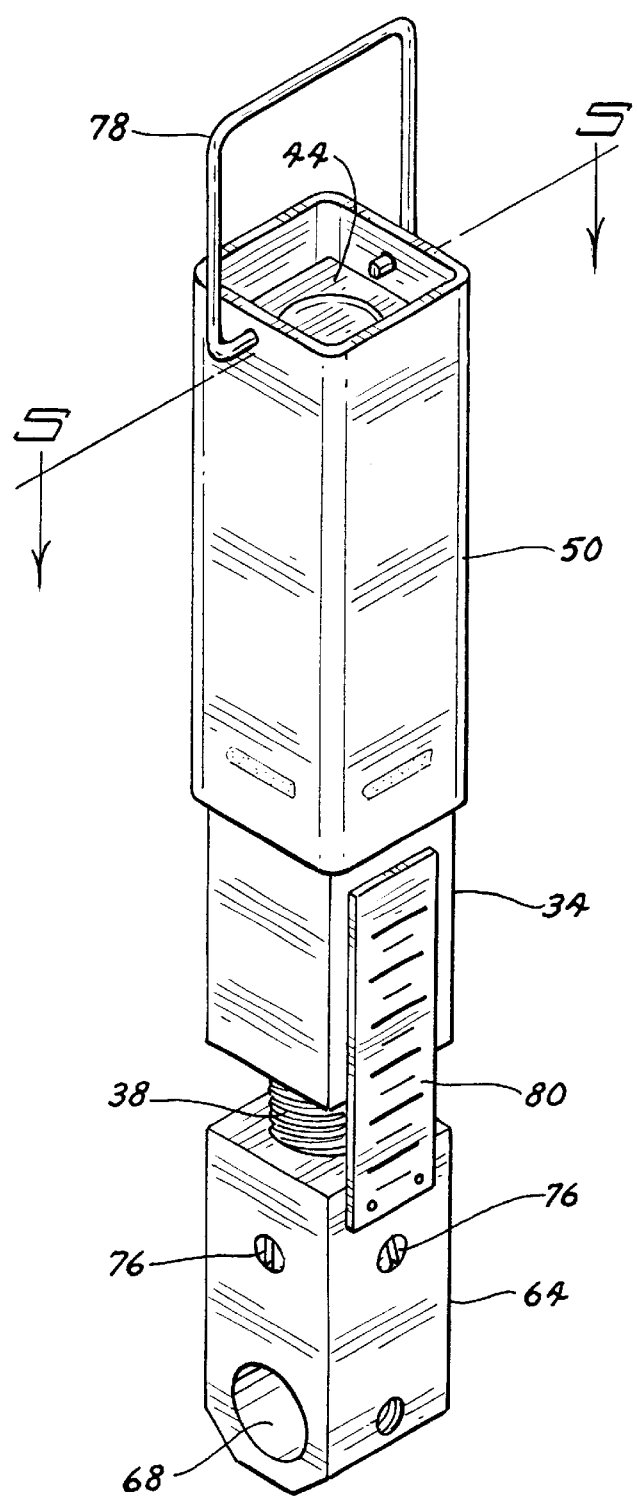
FIG. 4 shows the invention in a perspective view with a handle and a scale.
Figure 5:
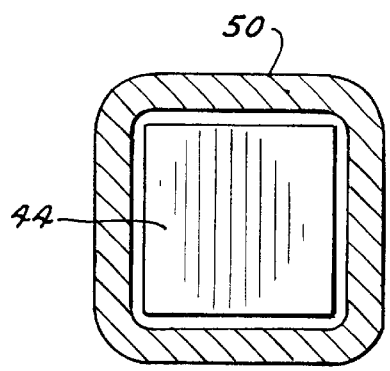
FIG. 5 is a cross sectional view of the present invention taken along viewing plane 5—5 of FIG. 4 illustrating an alternate embodiment of the interlocking cross sectional profiles of the nut and socket.
Figure 6:
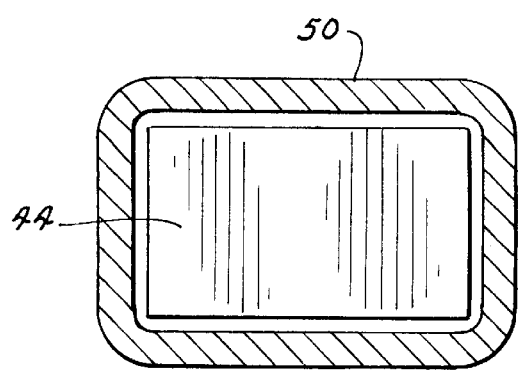
FIG. 6 illustrates an alternate embodiment of the interlocking cross sectional profiles of the nut and socket.
Figure 7:
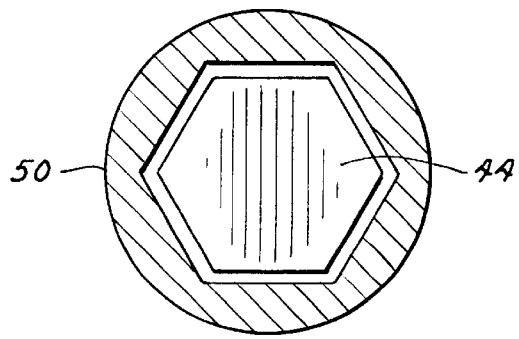
FIG. 7 illustrates an alternate embodiment of the interlocking cross sectional profiles of the nut and socket.
Figure 8:
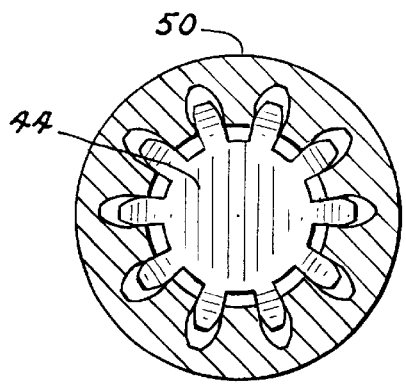
FIG. 8 illustrates an alternate embodiment of the interlocking cross sectional profiles of the nut and socket.
Figure 9:
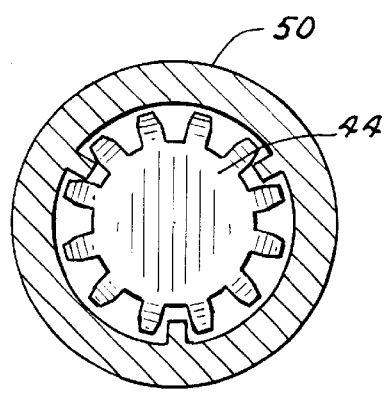
FIG. 9 illustrates an alternate embodiment of the interlocking cross sectional profiles of the nut and socket.

Referring particularly to FIGS. 2–4, the height adjustment apparatus 14 will now be described. Apparatus 14 includes a frame bracket 34 that is rigidly attached to the frame 18. The frame bracket 34 is provided with a threaded bore 36 in any known manner so as to be able to threadably receive a threaded rod 38. The lower end 40 of the rod 38 is smooth; that is, without threads. The upper end 42 of the rod 38 is attached to a nut 44. The nut 44 is shown in FIG. 3 as being attached with a pin 46. It is understood that the nut 44 may be attached to the rod 38 by any method known in the art, including welding. Alternatively, the rod 38 may be a threaded bolt. A machined groove 48 is disposed in the lower end 40 of the rod 38.

Referring now to FIGS. 5–9, the socket 50 and nut 44 have cross sectional profiles that allow slidable engagement of the socket 50 with the nut 44 while at all times preventing rotational movement of the socket 50 relative to the nut 44. The Figures illustrate embodiments of cross sectional slidably interlocked profiles for the nut 44 and socket 50 with no relative rotational movement between the nut 44 and socket 50. The socket 50 and the frame bracket 34 have cross-sectional profiles that allow the socket 50 to slidably engage the frame bracket 34 to prevent rotational movement of the socket 50 relative to the frame bracket 34 during normal operation of the cutting unit 20.

Referring particularly to FIGS. 2–3, the rod 38 is disposed through a socket 50 having a central bore 54. The socket 50 is configured to slidably engage the nut 44 and is recessed at the bottom surface 52 to slidably receive and engage the upper surface 35 of the frame bracket 34. A biasing means retainer 58 is rigidly attached inside the central bore 54 of the socket 50. Alternatively, the socket 50 may include a recessed bottom surface 52 that may be used as a biasing means retainer 58. The socket 50 is held engaged with the frame bracket 34 by a biasing means 62. The biasing means 62 may be a compression spring, compression washer, air cylinder, or other equivalent structure. Alternatively, the socket 50 may be manufactured with sufficient mass such that gravity is used to hold the socket 50 engaged with the frame bracket 34. Where a compression spring or compression washer is utilized, the spring or washer may be captured between a biasing means retainer 58 attached within the bore 54 of the socket 50 and the lower surface 45 of the nut 44. The biasing means 62 is disposed between the lower surface 45 of the nut 44 and the upper surface 61 of the biasing means retainer 58. The socket 50 is disengaged from the frame bracket 34 by substantially vertical application of force to the socket 50 sufficient to overcome the biasing means 62. When the socket 50 disengages the frame bracket 34, the socket 50 may be rotated in either direction.

The lower end 40 of the rod 38 is received by a smooth bore 66 located in a swivel head 64 to allow free rotation of the rod 38 thereof. The swivel head 64 includes a transverse bore 68 to receive the roller shaft 32. The roller shaft 32 is attached to the swivel head 64 by any means known in the art to prevent rotation of the roller shaft 32 relative to the swivel head 64. The roller 30 is allowed to rotate freely in relation to the roller shaft through well known means such as bearings mounted on the roller shaft 32. Alternatively, relative rotation may be prevented between the roller shaft 32 and the roller 30 by any means known in the art. In this embodiment, bearings or other equivalent means may be mounted on the swivel head 64, allowing the roller shaft 32 and roller 30 to rotate relative to the swivel head 64.

The rod-receiving bore 66 of the swivel head 64 has a bottom surface 70 that supports the bottom surface 41 of the threaded rod 38. The bore 66 and bottom surface 70 of the swivel head bore 66 provide substantially smooth surfaces to facilitate rotation of the rod 38 during the height adjustment operation. Swivel head 64 includes a plurality of threaded holes 74 that receive threaded screws 76, which extend inwardly into the bore 66 to engage the machined groove 48 disposed in the smooth lower end 40 of the rod 38. Thus, when the rod 38 is inserted into the swivel head bore 46, screws 76 are inserted to engage the groove 48 and retain the rod 38 within the bore 66 while allowing the rod 38 to freely rotate relative thereto.

As indicated in FIG. 4, another embodiment of the present invention may include a handle 78 to facilitate the raising and lowering of the socket 50 against the force of the biasing means 62 and to assist in rotation of the socket 50 during height adjustment operations. In addition, a rubber or vinyl grip covering all or a portion of the socket 50 may be included to assist in raising and lowering the socket 50 and rotation of the socket 50 during height adjustment operations. Additionally, a scale 80 to assist in precisely setting the height of the grass to be cut may be included. The scale may measure the distance between the upper surface of the swivel head and the lower surface of the frame bracket. The scale may further be calibrated in any known manner such that it measures the distance between the cutting unit and the ground.

Figure 10:
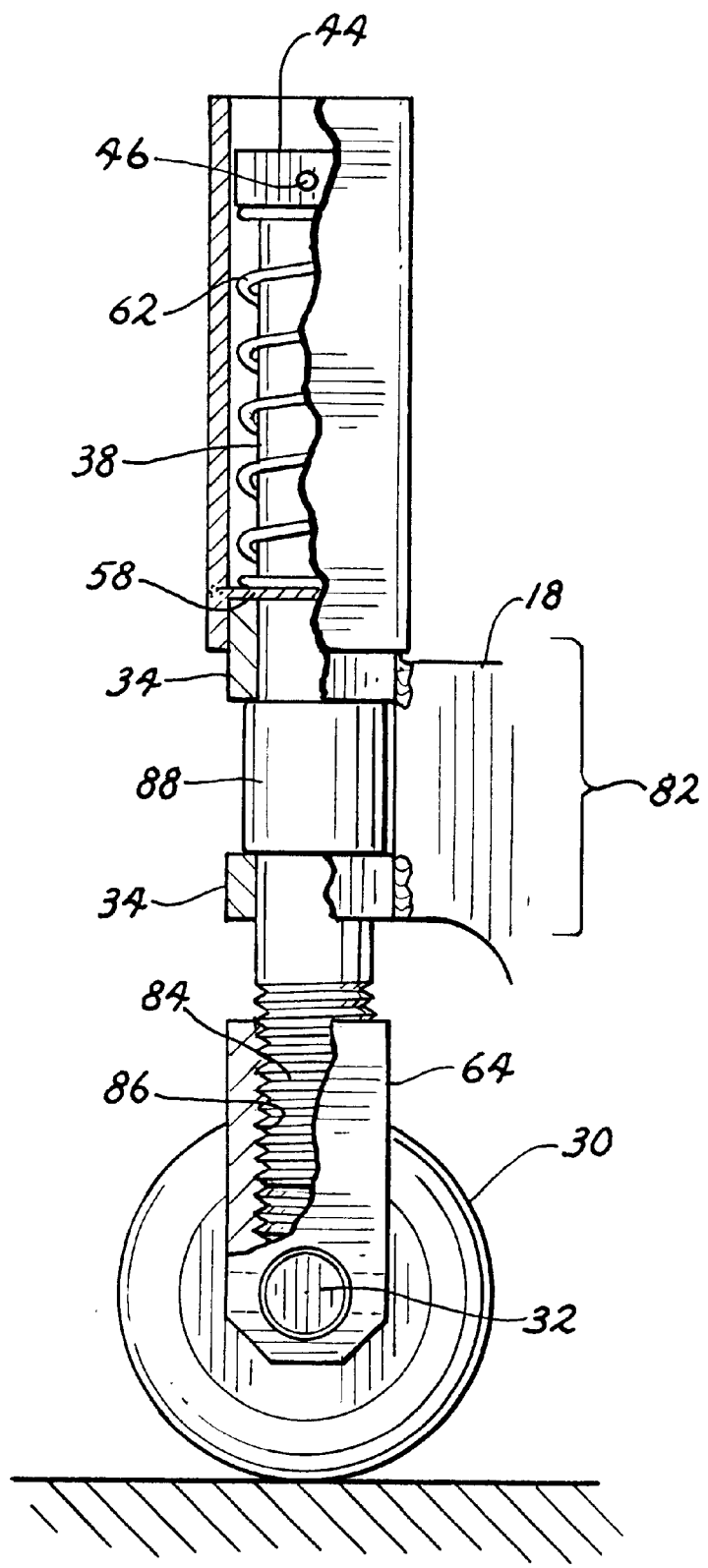
FIG. 10 illustrates an alternate embodiment of the present invention.

A further embodiment of the present invention is shown in FIG. 10. In this embodiment the lower end 84 of the threaded rod 38 is threaded. The threaded lower end 84 of the rod 38 is threadably engaged with a threaded bore 86 disposed within the swivel head 64. The rod 38 is rotationally engaged with the frame bracket 34 while being restrained from vertical translation relative to the frame bracket 34 by a vertical retention means 82. The Figure shows the vertical retention function being achieved by manufacturing a middle portion 88 of the rod 38 to a larger diameter than the central bore 36 of the frame bracket 34. This middle portion 88 of the rod 38 is then captured within the frame bracket 34 and restrained from vertical motion relative to the frame bracket 34 while still retaining rotational motion.

Operation of the Present Invention

With the foregoing description of the present invention, its operation can now be fully explained. Referring now to FIGS. 1–9, to adjust the height of the mower assembly 10 the socket 50 is moved directionally away from the frame bracket 34 against the force of the biasing means 62. When sufficient force is applied, the socket 50 disengages from the frame bracket 34 in a substantially vertical direction. The socket 50 may then be rotated in either direction. The rotation of the socket 50 causes the nut 44 and threaded rod 38 to rotate in the selected direction. Rotation of the threaded rod 38 causes the rod 38 to thread through the frame bracket 34 while the lower end 40 of the rod 38 rotates inside the smooth bore 66 of the swivel head 64. The swivel head 64 is attached to the roller shaft assembly 29, including the roller shaft 32 and roller 30, and is not rigidly attached to the frame 18. The frame bracket 34 is rigidly attached to the frame 18, which in turn supports the cutting unit 20 including the bed knife 26 and cutting reel 22. Consequently, any change in the vertical distance between the swivel head 64 and the frame bracket 34 changes the height of the roller shaft 30 and roller 32 relative to the frame bracket 34, frame 18, bed knife 26, and cutting reel 22.

Operation of the invention such that the threaded rod 38 is rotated in a clockwise direction causes the distance between the swivel head 64 and roller shaft assembly 29 relative to the frame bracket 34, frame 18 and cutting unit 20 to increase. The height of the frame bracket 34, frame 18, and cutting unit 20 relative to the ground is thus increased, resulting in the grass being cut at a longer length. Alternatively, counterclockwise rotation of the threaded rod 38 causes the distance between the swivel head 64, and roller shaft assembly 29 relative to the frame bracket 34, frame 18, and cutting unit 20 to decrease. The height of the frame bracket 34, frame 18, and cutting unit 20 relative to the ground is thereby decreased, resulting in the grass being cut at a shorter length.

The operation of the alternate embodiment of the present invention shown in FIG. 10 may also be explained. In this embodiment, the operation of the socket 50 relative to the nut 44, threaded rod 38 and frame bracket 34 remains as described above. The frame bracket 34 remains rigidly attached to the frame 18 which, in turn, supports the cutting unit 20 including the bed knife 26 and cutting reel 22. The swivel head 64 remains attached to the roller shaft assembly 29, including the roller shaft 32 and the roller 30. The swivel head 64 is not rigidly attached to the frame 18. However, in this embodiment, the lower portion of the threaded rod 38 is threadably engaged with the central bore 66 of the swivel head 64 while the threaded rod 38 is rotationally engaged with the frame bracket 34. The threaded rod 38 is prevented from vertical translation with respect to the frame bracket 34.

Rotation of the rod 38 in this embodiment results in the lower threaded end of the rod 38 threadably engaging the threaded bore 86 of the swivel head 64. Clockwise rotation of the threaded rod 38 causes the distance between the swivel head 64 and roller shaft assembly 29 relative to the frame bracket 34, frame 18 and cutting unit 20 to increase. The height of the frame bracket 34, frame 18, and cutting unit 20 relative to the ground is thus increased, resulting in the grass being cut at a longer length. Alternatively, counterclockwise rotation of the threaded rod 38 causes the distance between the swivel head 64 and roller shaft assembly 29 relative to the frame bracket 34, frame 18, and cutting unit 20 to decrease. The height of the frame bracket 34, frame 18, and cutting unit 20 relative to the ground is thereby decreased, resulting in the grass being cut at a shorter length.

Various means may be used in this embodiment to prevent vertical translation of the threaded rod 38 relative to the frame bracket 34. FIG. 10 shows the threaded rod 38 with a middle portion 88 of the rod 38 being captured between two portions of the frame bracket 34 by having a diameter that is larger than the central bore 36 of the frame bracket 34. It is understood that a variety of methods known in the art may be used to prevent vertical translation of the rod 38 relative to the frame bracket 34, while allowing free rotation of the rod 38. For example, the use of retention rings attached to the rod 38 above and below the frame bracket 34 may be used to achieve the necessary vertical retention.

Various means may be used to facilitate the raising and lowering of the socket 50 against the biasing means 62 and assist in rotating the socket 50 to adjust the cutting unit 20 height. One such means may include a handle 78 to assist in the raising, lowering and rotation of the socket 50. Alternatively, a rubber or vinyl grip covering substantially all of the external surface of the socket 50 may be used to facilitate the height adjustment operation. A scale 80 may be used to more precisely adjust the height of the cutting unit 20 relative to the ground. The scale 80 may be rigidly attached to the swivel head 64 such that the distance between the upper surface 69 of the swivel head 64 and the lower surface 37 of the frame bracket 34 may be measured.

The present invention having thus been described, other modifications, alterations, or substitutions may now suggest themselves to those skilled in the art, all of which are within the spirit and scope of the present invention. It is therefore intended that the present invention be limited only by the scope of the attached claims below.

What is claimed is:

1. A height adjustment apparatus for turf maintenance equipment wherein the equipment is comprised of a ground contacting support and a frame that supports an operational unit, said apparatus comprising:
   a threaded rod having a top end and a lower end;
   a nut having an upper surface and a lower surface, wherein said nut is rigidly attached to said top end of said threaded rod;
   a frame bracket, said frame bracket threadably receiving said threaded rod and being rigidly attached to the frame, said frame bracket further having an upper and lower surface;
   a swivel head, said swivel head having a central bore and being attached to the ground contacting support, wherein said lower end of said threaded rod rotationally engages said bore of said swivel head;
   a socket having an upper end, a lower end, an upper surface and a lower surface, said socket receiving said threaded rod and slidably engaging said nut and said frame bracket, wherein said socket is held non-rotationally engaged with said frame bracket;
   a biasing means, said biasing means biasing said socket into a non-rotational engagement with said frame bracket;
   wherein disengagement of said socket from said frame bracket enables said socket to be rotated and rotation of said socket causes said rod to rotate through said threaded bore of said frame bracket and to rotate within said central bore of said swivel head, causing the frame and operational unit to raise or lower relative to the ground contacting support.

2. The apparatus of claim 1 wherein said biasing means is a spring.

3. The apparatus of claim 1 wherein said lower end of said threaded rod and said central bore of said swivel head are substantially smooth.

4. The apparatus of claim 1 wherein a machined groove is disposed circumferentially around said lower end of said rod and further including means for engaging said groove and said swivel head, said means substantially preventing vertical movement of said rod while allowing free rotation of said rod.

5. The apparatus of claim 1, further including a scale for measuring the distance between a roller shaft of said ground contacting support and said frame attachment, wherein said scale is fixedly attached.

6. The apparatus of claim 5 wherein said scale is calibrated such that said scale measures the height of the cutting unit from the ground.

7. The apparatus of claim 1 wherein said socket is an elongated shell that substantially covers said threaded rod between said frame bracket and said nut, said upper end of said socket having a cross sectional profile that slidably interlocks in a non-rotational aspect with said nut and said lower end of said socket having a cross sectional profile that slidably interlocks in a non-rotational aspect with said upper end of said frame bracket when so engaged.

8. The apparatus of claim 1 wherein said socket further includes a recessed lower surface, said recessed lower surface engaging said upper surface of said frame bracket.

9. The apparatus of claim 1 wherein said socket further includes a biasing means retainer, said biasing means retainer having an upper and lower surface.

10. The apparatus of claim 9 wherein said biasing means is captured between said upper surface of said biasing means retainer and said lower surface of said nut.

11. A height adjustment apparatus for turf maintenance equipment wherein the equipment is comprised of a ground contacting support and a frame that supports an operational unit, said apparatus comprising:
   a threaded rod having an upper end, a lower end and a middle portion, said lower end being threaded and said upper end and middle portions being thread-free;
   a nut having an upper surface and a lower surface, wherein said nut is rigidly attached to said top end of said threaded rod;
   a frame bracket, said frame bracket rigidly attached to the frame and having an upper surface and lower surface and non-threaded central bore, said central bore rotationally receiving said threaded rod;
   a vertical retention means, said vertical retention means preventing vertical movement of said rod relative to said frame bracket while allowing free rotation of said rod within said central bore of said frame bracket;
   a swivel head, said swivel head attached to the ground contacting support having a threaded bore, wherein said lower end of said threaded rod threadably engages said bore of said swivel head;

a socket having an upper end, a lower end, an upper surface and a lower surface, said socket receiving said threaded rod and slidably engaging said nut and said frame bracket, wherein said socket is held non-rotationally engaged with said frame bracket;

wherein disengagement of said socket from said frame attachment enables said socket to be rotated and rotation of said socket causes said rod to rotate within said central bore of said frame attachment and to threadably engage said threaded bore of said swivel head, causing the frame and operational unit to raise or lower relative to the ground contacting support.

12. The apparatus of claim 11 wherein said vertical retention means is comprised of said middle portion of said threaded rod having a larger diameter than said central bore of said frame bracket, said middle portion being captured within said central bore of said frame bracket.

13. The apparatus of claim 11 wherein said biasing means is a spring.

14. The apparatus of claim 11, further including a scale for measuring the distance between said roller shaft and said frame attachment, wherein said scale is fixedly attached.

15. The apparatus of claim 11 wherein said scale is calibrated such that said scale measures the height of the cutting unit from the ground.

16. The apparatus of claim 11 wherein said socket is an elongated shell that substantially covers said threaded rod between said frame bracket and said nut, said upper end of said socket having a cross sectional profile that slidably interlocks in a non-rotational aspect with said nut and said lower end of said socket having a cross sectional profile that slidably interlocks in a non-rotational aspect with said upper end of said frame bracket when so engaged.

17. The apparatus of claim 11 wherein said socket further includes a recessed lower surface, said recessed lower surface engaging said upper surface of said frame bracket.

18. The apparatus of claim 11 wherein said socket further includes a biasing means retainer, said biasing means retainer having an upper and lower surface.

19. The apparatus of claim 18 wherein said biasing means is captured between said upper surface of said biasing means retainer and said lower surface of said nut.

* * * * *